(12) United States Patent
Jiang et al.

(10) Patent No.: US 9,356,510 B2
(45) Date of Patent: May 31, 2016

(54) CONSTANT ON-TIME SWITCHING CONVERTER AND CONTROL METHOD THEREOF

(71) Applicant: Chengdu Monolithic Power Systems Co., Ltd., Chengdu (CN)

(72) Inventors: Lijie Jiang, Hangzhou (CN); Xiaokang Wu, Hangzhou (CN); Qian Ouyang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 168 days.

(21) Appl. No.: 14/310,293

(22) Filed: Jun. 20, 2014

(65) Prior Publication Data

US 2014/0375286 A1    Dec. 25, 2014

(30) Foreign Application Priority Data

Jun. 20, 2013    (CN) .......................... 2013 1 0245729

(51) Int. Cl.
*H02M 3/158*    (2006.01)
*H02M 3/156*    (2006.01)
*H02M 1/00*    (2006.01)

(52) U.S. Cl.
CPC ...... *H02M 3/156* (2013.01); *H02M 2001/0025* (2013.01)

(58) Field of Classification Search
CPC .......... H02M 3/156–3/158; H02M 2001/0025; Y02B 70/1466
USPC .................... 323/271, 272, 282, 283
See application file for complete search history.

(56) References Cited

U.S. PATENT DOCUMENTS

| 8,373,395 | B2 * | 2/2013 | Yashiki ................. | H02M 3/156 323/222 |
| 8,604,769 | B2 * | 12/2013 | Murakami ............ | H02M 3/156 323/284 |
| 8,717,002 | B2 * | 5/2014 | Xi .......................... | H02M 3/158 323/285 |
| 8,810,156 | B2 * | 8/2014 | Brassfield ........... | H05B 33/0818 315/291 |
| 2013/0141069 | A1 | 6/2013 | Li | |
| 2013/0147454 | A1 | 6/2013 | Wang | |
| 2013/0257399 | A1 * | 10/2013 | Jiang ........................ | G05F 1/10 323/271 |

* cited by examiner

*Primary Examiner* — Yemane Mehari
(74) *Attorney, Agent, or Firm* — Perkins Coie LLP

(57) ABSTRACT

A switching converter providing an output voltage has at least one switch and a control circuit. The control circuit has a slope compensation module, an output correction module and a control module, wherein the slope compensation module provides a slope compensation signal, the output correction module provides a voltage trim signal based on the slope compensation signal, and the control module provides a control signal to control the at least one switch based on the slope compensation signal, the voltage trim signal, a reference signal, the output voltage and an error compensation signal provided based on a difference between the output voltage and a set target of the output voltage.

20 Claims, 12 Drawing Sheets

CONSTANT ON-TIME SWITCHING CONVERTER AND CONTROL METHOD THEREOF

CROSS-REFERENCE TO RELATED APPLICATIONS(S)

This application claims the benefit of CN application No. 201310245729.0, filed on Jun. 20, 2013, and incorporated herein by reference.

TECHNICAL FIELD

The present invention relates to electrical circuit, more particularly but not exclusively relates to switching converter.

BACKGROUND

Constant ON-time control is widely used in applications of switching converter because of its excellent load transient response, simple circuitry structure and smooth operation mode switching. In most applications, a comparator is used for comparing a feedback signal reflecting an output voltage of a switching converter with a reference signal. Based on a comparison result, the switching converter controls at least one switch to adjust the output voltage. For example, when the feedback signal is less than the reference signal, the at least one switch is turned ON until a predetermined ON-time period expires.

However, if an output voltage ripple is large, the comparator actually compares valley of the feedback signal with the reference signal in each working period. There exists an error between the actual output voltage and a set target of the output voltage. For applications with small output voltage, such as DSP/CPU/Memory power supplies, the error generated by the output voltage ripple will seriously affect output voltage accuracy of the switching converter. For example, if the set target of the output voltage is 1V and amplitude of the output voltage ripple is 50 mV, then the actual output voltage is 2.5% higher than the set target of the output voltage.

One of the present solutions is to introduce an error compensation signal by an error amplifier based on a difference between the output voltage and the set target of the output voltage. For example, the error compensation signal is subtracted from the reference signal as a corrected reference signal which is compared with the feedback signal. However, it is not easy to design the error amplifier. On one hand, fast response of the error amplifier will lower transient response of the switching converter. On the other hand, slow response of the error amplifier will prolong the time period that the output voltage achieves the set target.

SUMMARY

It is one of the objects of the present invention to provide switching converter, control circuit and associated control method to improve accuracy of an output voltage of the switching converter and reduce a time period that the output voltage achieves a set target of the output voltage at the same time.

One embodiment of the present invention discloses a control circuit for controlling a switching converter, the switching converter comprises at least one switch, wherein the control circuit comprises a slope compensation module configured to provide a slope compensation signal, an output correction module configured to provide a voltage trim signal based on the slope compensation signal, and a control module comprising an error compensation module, the error compensation module is configured to provide an error compensation signal based on a difference between an output voltage of the switching converter and a set target of the output voltage, and the control module is configured to provide a control signal to turn ON the at least one switch based on the slope compensation signal, the voltage trim signal, the error compensation signal, a reference signal and the output voltage of the switching converter.

In one embodiment, the control module further comprises a comparison module configured to provide a comparison signal based on the slope compensation signal, the voltage trim signal, the error compensation signal, the reference signal and the output voltage of the switching converter, an ON-time control module configured to provide an ON-time control signal, and a logic module configured to provide the control signal to turn ON the at least one switch based on the comparison signal and turn OFF the at least one switch based on the ON-time control signal.

Another embodiment of the present invention discloses a switching converter, wherein the switching converter may comprise at least one switch and the control circuit described above.

Yet another embodiment of the present invention discloses a control method for a switching converter, the switching converter comprises at least one switch and the control method comprises: providing an ON-time control signal to control an ON-time period of the at least one switch; providing a slope compensation signal, wherein the slope compensation signal increases with a slew rate when the at least one switch is turned OFF; providing a voltage trim signal based on the slope compensation signal; providing an error compensation signal based on a difference between an output voltage of the switching converter and a set target of the output voltage; providing a comparison signal based on the slope compensation signal, the voltage trim signal, the error compensation signal, a reference signal and the output voltage of the switching converter; and turning ON the at least one switch based on the comparison signal and turning OFF the at least one switch based on the ON-time control signal.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to switch mode power supply, control circuit and associated control method. As used hereinafter, the term "couple" generally refers to multiple ways including a direct connection with an electrical conductor and an indirect connection through intermediate diodes, resistors, capacitors, and/or other intermediaries.

Figure 1:
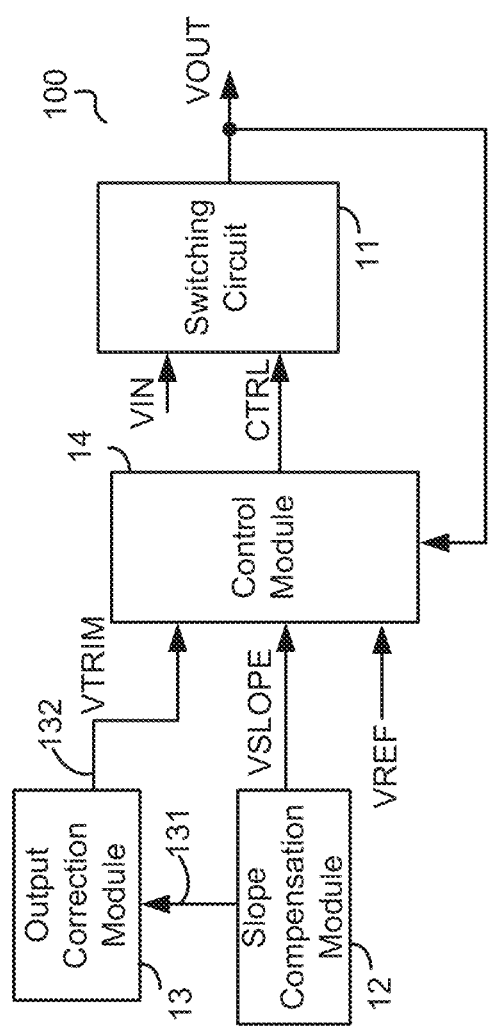
FIG. 1 illustrates a circuit block diagram of a switching converter 100 according to an embodiment of the present invention.

FIG. 1 illustrates a circuit block diagram of a switching converter 100 according to an embodiment of the present invention. Switching converter 100 comprises a switching circuit 11, a slope compensation module 12, an output correction module 13 and a control module 14.

Switching circuit 11 comprises at least one switch and converts an input voltage VIN into an output voltage VOUT through ON and OFF switching of the at least one switch. Switching circuit 11 may be configured in any known DC/DC or AC/DC topology, such as BUCK converter, BOOST converter, Flyback converter and so on. The at least one switch in switching circuit 11 may be any controllable semiconductor device, such as MOSFET (metal oxide semiconductor field effect transistor), IGBT (isolated gate bipolar transistor) and so on.

Slope compensation module 12 generates a slope compensation signal VSLOPE. Output correction module 13 comprises an input terminal 131 and an output terminal 132, wherein input terminal 131 is coupled to slope compensation module 12, and output terminal 132 is configured to provide a voltage trim signal VTRIM based on slope compensation signal VSLOPE. Control module 14 is configured to receive voltage trim signal VTRIM, slope compensation signal VSLOPE, a reference signal VREF representing a set target of output voltage VOUT and output voltage VOUT or a feedback signal VFB representing output voltage VOUT, and control module 14 is configured to provide a control signal CTRL to turning ON and/or turning OFF the at least one switch. In one embodiment, when control module 14 receives output voltage VOUT, reference signal VREF equals the set target of output voltage VOUT.

Output voltage VOUT may be quickly corrected with a simple and easy way by introducing voltage trim signal VTRIM, so as to improve accuracy of output voltage VOUT, and shorten a time period that output voltage VOUT achieves the set target of output voltage VOUT at the same time.

Figure 2:
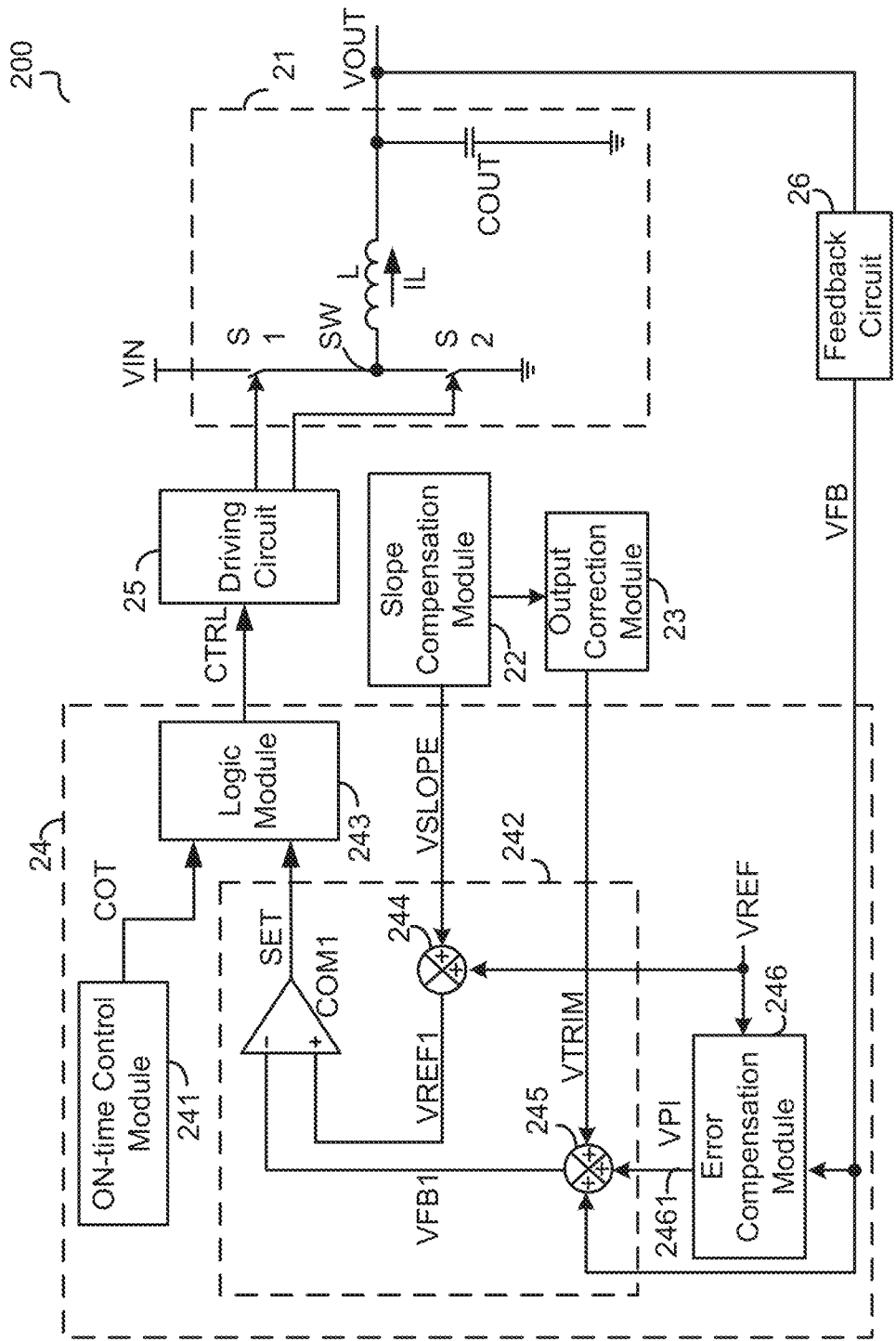
FIG. 2 schematically illustrates a switching converter 200 according to an embodiment of the present invention.

FIG. 2 schematically illustrates a switching converter 200 according to an embodiment of the present invention. Switching converter 200 comprises a switching circuit 21, a slope compensation module 22, an output correction module 23 and a control module 24.

Switching circuit 21 comprises a switch S1, a switch S2, an inductor L and an output capacitor COUT. Switching circuit 21 is configured to convert input voltage VIN to output voltage VOUT via turning ON and turning OFF switch S1 and switch S2. One terminal of switch S1 is coupled to input voltage VIN, the other terminal of switch S1 is coupled to one terminal of switch S2, and the other terminal of switch S2 is coupled to a system ground. One terminal of inductor L is coupled to a common terminal SW of switch S1 and switch S2, the other terminal of inductor L is coupled to one terminal of output capacitor COUT, and the other terminal of output capacitor COUT is coupled to the system ground. Voltage across output capacitor COUT is output voltage VOUT. In one embodiment, switch S2 may be substituted by a diode.

Slope compensation module 22 is configured to provide slope compensation signal VSLOPE. In one embodiment, slope compensation signal VSLOPE increases with a slew rate SR when switch S1 is turned OFF, and slope compensation signal VSLOPE maintains or decreases when switch S1 is turned ON. Output correction module 23 is coupled to slope compensation module 22 and is configured to provide voltage trim signal VTRIM based on slope compensation signal VSLOPE. In one embodiment, output correction module 23 is configured to provide voltage trim signal VTRIM based on amplitude of slope compensation signal VSLOPE or slew rate SR of slope compensation signal VSLOPE. In one embodiment, voltage trim signal VTRIM equals amplitude of slope compensation signal VSLOPE. In one embodiment, voltage trim signal VTRIM equals slew rate SR multiplied by a time period during which slope compensation signal VSLOPE increases. In another embodiment, voltage trim signal VTRIM is expressed by following equation (1):

$$VTRIM = SR(TS - TB) \tag{1}$$

where TS represents a switching period of switching circuit 21, and TB represents a time period that slope compensation signal VSLOPE maintains or decreases.

Control module 24 comprises an ON-time control module 241, a comparison module 242 comprising a comparator COM1, an operation circuit 244 and an operation circuit 245, and a logic module 243. ON-time control module 241 is configured to provide an ON-time control signal COT to control ON-time period of switch S1. In one embodiment, ON-time period of switch S1 is constant. In another embodiment, ON-time period of switch S1 is varied with input voltage VIN and/or output voltage VOUT. Comparator COM1 is coupled to slope compensation module 22 through operation circuit 244, and is coupled to output correction module 23 and switching circuit 21 through operation circuit 245, and is configured to provide a comparison signal SET based on slope compensation signal VSLOPE, voltage trim signal VTRIM, reference signal VREF and output voltage VOUT. In one embodiment, comparison signal SET is related with an arithmetic result ART1, where ART1=VLSOPE+VREF−VTRIM−VFB, e.g., comparison signal SET is effective when ART1 is positive, and comparison signal SET is ineffective when ART1 is negative. In one embodiment, voltage at a non-inverting terminal of comparator COM1 is related with sum of reference signal VREF and slope compensation signal VSLOPE, voltage at an inverting terminal of comparator COM1 is related with sum of voltage trim signal VTRIM and feedback signal VFB, and an output terminal of comparator COM1 is configured to provide comparison signal SET via comparing sum of voltage trim signal VTRIM and feedback signal VFB with sum of reference signal VREF and slope compensation signal VSLOPE. Operation circuit 244 is configured to receive slope compensation signal VSLOPE and reference signal VREF and is configured to provide a corrected reference signal VREF1 to the non-inverting terminal of comparator COM1 based on sum of slope compensation signal VSLOPE and reference signal VREF. Operation circuit 245 is configured to receive voltage trim signal VTRIM, and feedback signal VFB, and is configured to provide a corrected feedback signal VFB1 to the inverting terminal of comparator COM1 based on sum of voltage trim signal VTRIM and feedback signal VFB. Logic module 243 is coupled to ON-time control module 241 and comparator COM1, and logic module 243 is configured to provide control signal CTRL based on ON-time control signal COT and comparison signal SET. One of ordinary skill in the art should appreciate that operation circuit 245 may receive output voltage VOUT directly instead of receive feedback signal VFB, and corrected feedback signal VFB1 equals sum of voltage trim signal VTRIM and output voltage VOUT.

In one embodiment, control module 24 further comprises an error compensation module 246. Error compensation module 246 is configured to receive reference signal VREF and feedback signal VFB, and is configured to provide an error compensation signal VPI at its output terminal 2461 based on a difference between reference signal VREF and feedback signal VFB. Error compensation module 246 is used to eliminate the difference between reference signal VREF and feedback signal VFB, wherein reference signal VREF represents the set target of output voltage VOUT and feedback signal VFB represents output voltage VOUT, as a result, the actual output voltage VOUT and the set target of output voltage VOUT are adjusted to be substantially equal, and accuracy of output voltage VOUT is improved. One of ordinary skill in the art should understand that error compensation module 246 also may be configured to receive reference signal VREF and output voltage VOUT directly, and is configured to provide error compensation signal VPI based on a difference between reference signal VREF and output voltage VOUT, where reference signal VREF is the set target of output voltage VOUT.

In one embodiment, control module 24 is configured to provide comparison signal SET based on feedback signal VFB, reference signal VREF, error compensation signal VPI, voltage trim signal VTRIM and slope compensation signal VSLOPE. In one embodiment, comparison signal SET is related with an arithmetic result ART2, where ART2=VLSOPE+VREF−VTRIM−VFB−VPI, e.g., comparison signal SET is effective when ART2 is positive, and comparison signal SET is ineffective when ART2 is negative. In one embodiment, error compensation module 246 may be implemented by an analog circuit comprising an error amplifier. In another embodiment, error compensation module 246 may be implemented by a digital circuit comprising digital compensation loop, e.g., proportion-integral (PI) control. In one embodiment, output terminal 2461 of error compensation module 246 is coupled to the non-inverting terminal of comparator COM1 through operation circuit 245. As shown in FIG. 2, operation circuit 245 is configured to receive error compensation signal VPI and is configured to provide corrected feedback signal VFB1 based on sum of voltage trim signal VTRIM, feedback signal VFB and error compensation signal VPI. One of ordinary skill in the art should also appreciate that operation circuit 245 may coupled to receive output voltage VOUT directly instead of coupled to receive feedback signal VFB, and comparison signal SET is related with VLSOPE+VREF−VTRIM−VOUT−VPI.

In one embodiment, switching converter 200 further comprises a driving circuit 25. Driving circuit 25 is coupled to logic module 243 to receive control signal CTRL and is configured to provide driving signals to switch S1 and switch S2 to turning ON and turning OFF switch S1 and S2.

In one embodiment, switching converter 200 further comprises a feedback circuit 26. Feedback circuit 26 is coupled to output voltage VOUT and is configured to provide feedback signal VFB representing output voltage VOUT. One of ordinary in the art should understand that feedback circuit 26 may be a resistor divider, a capacitor divider or any other suitable sampling circuit.

Figure 3:
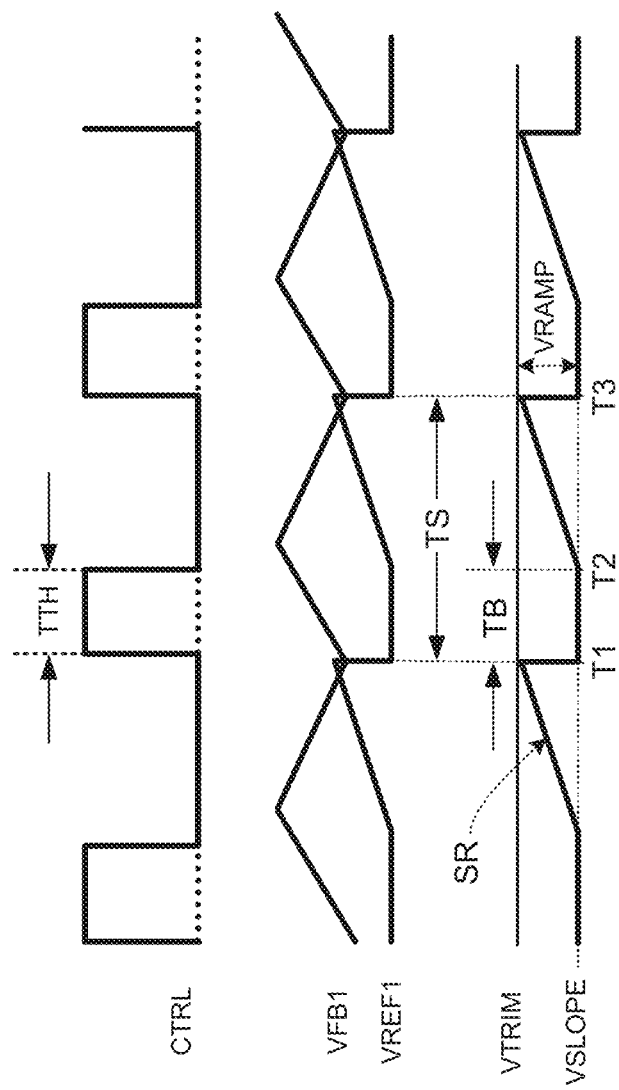
FIG. 3 shows waveforms illustrating signals of switching converter 200 as shown in FIG. 2 according to an embodiment of the present invention.

FIG. 3 shows waveforms illustrating signals of switching converter 200 as shown in FIG. 2 according to an embodiment of the present invention.

At time T1, switch S1 is turned ON and switch S2 is turned OFF when control signal CTRL is high voltage level, and slope compensation signal VSLOPE maintains constant, such as zero. Voltage trim signal VTRIM equals amplitude VRAMP of slope compensation signal VSLOPE. In one embodiment, corrected reference signal VREF1 equals sum of reference signal VREF and slope compensation signal VSLOPE, and corrected feedback signal VFB1 equals sum of voltage trim signal VTRIM and output voltage VOUT. At time T2, ON-time period of switch S1 achieves a threshold time period TTH set by ON-time control module 241, and control signal CTRL become low voltage level to turn OFF switch S1 and turn ON switch S2. Slope compensation signal SLOPE increases with slew rate SR. At time T3, corrected feedback signal VFB1 is less than corrected reference signal VREF1 then control signal CTRL becomes high voltage level to turn ON switch S1 and turn OFF switch S2. These processes are repeated.

Amplitude VRAMP of slope compensation signal VSLOPE is equal to slew rate SR multiplied by the time period during which slope compensation signal VSLOPE increases. In the embodiment shown in FIG. 3, amplitude VRAMP of slope compensation signal VSLOPE is expressed by following equation (2):

$$VRAMP=(TS-TB)SR \qquad (2)$$

where TS represents a switching period of switching circuit 21, and TB represents a time period during which slope compensation signal VSLOPE maintains zero.

Continuing with FIG. 3, slope compensation signal VSLOPE is zero when switch S1 is turned ON and switch S2 is turned OFF, and slope compensation signal VSLOPE increases with slew rate SR when switch S1 is turned OFF and switch 82 is turned ON. However, one of ordinary skill in the art should understand that any other suitable slope compensation signal VSLOPE may be employed for stability, such as a triangular wave signal having inversed phase with inductor current IL, i.e., decreasing when switch S1 is turned ON and switch 52 is turned OFF, and increasing when switch S1 is turned OFF and switch S2 is turned ON.

In one embodiment, voltage trim signal VTRIM equals amplitude VRAMP of slope compensation signal VSLOPE, a difference between output voltage VOUT and the set target of output voltage VOUT caused by slope compensation signal VSLOPE can be compensated quickly, as a result, output voltage VOUT can achieve the set target of output voltage VOUT within a short time period.

Figure 4:
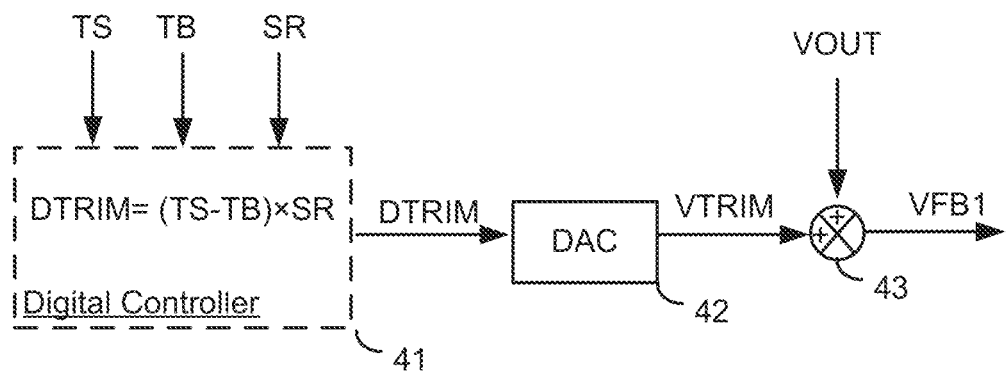
FIG. 4 schematically illustrates an online voltage trim signal adjustment circuit according to an embodiment of the present invention.

FIG. 4 schematically illustrates an online voltage trim signal adjustment circuit according to an embodiment of the present invention. A digital controller 41 is configured to provide a real-time digital voltage trim signal DTRIM to a digital-to-analog converter (DAC) 42, and DAC 42 is configured to provide voltage trim signal VTRIM accordingly. An operation circuit 43 is coupled to DAC 42 to receive voltage trim signal VTRIM and is coupled to output voltage VOUT, and operation circuit 43 is configured to provide corrected feedback signal VFB1 to comparator COM1 shown in FIG. 2 based on sum of voltage trim signal VTRIM and output voltage VOUT. In one embodiment, digital controller 41 is configured to adjust digital voltage trim signal DTRIM in accordance with slew rate SR of slope compensation signal VSLOPE. As shown in FIG. 4, digital voltage trim signal DTRIM equals product of slew rate SR of slope compensation signal VSLOPE and difference between switching period TS and time period TB during which slope compensation signal VSLOPE maintains or decreases. In one embodiment, digital voltage trim signal DTRIM equals amplitude VRAMP of slope compensation signal VSLOPE. In one embodiment, slope compensation signal VSLOPE is digital signal and may be provided by digital controller 41.

Figure 5:
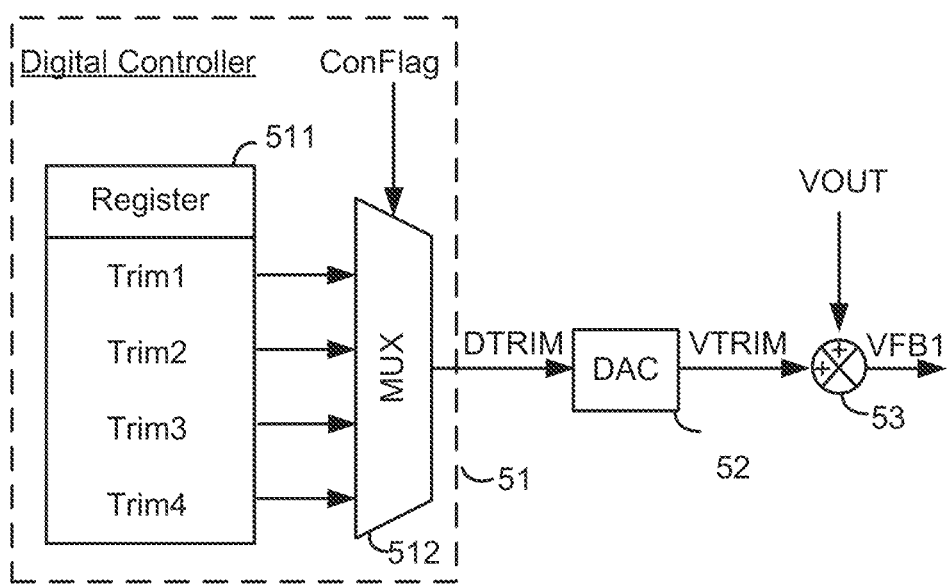
FIG. 5 schematically illustrates an offline voltage trim signal adjustment circuit according to an embodiment of the present invention.

FIG. 5 schematically illustrates an offline voltage trim signal adjustment circuit according to an embodiment of the present invention. A digital controller 51 is configured to preset a plurality of voltage trim coefficients based on slope compensation signal VSLOPE, and select one of voltage trim coefficients as digital voltage trim signal DTRIM in accordance with a system state. A digital-to-analog converter (DAC) 52 is configured to receive digital voltage trim signal DTRIM and provide voltage trim signal VTRIM accordingly. An operation circuit 53 is coupled to DAC 52 to receive voltage trim signal VTRIM and is coupled to output voltage VOUT, and is configured to provide corrected feedback signal VFB1 to comparator COM1 as shown in FIG. 2 based on sum of voltage trim signal VTRIM and output voltage VOUT. Voltage trim signal VTRIM may be adjusted by digital controller 51 in accordance with the system state. As shown in FIG. 5, digital controller 51 comprises a register 511 and a multiplexer 512. Register 511 is configured to provide voltage trim coefficients Trim1, Trim2, Trim3 and Trim4. Multiplexer 512 is coupled to register 511 to receive voltage trim coefficients Trim1, Trim2, Trim3 and Trim4, and multiplexer 512 is configured to select one of voltage trim coefficients Trim1-Trim4 as digital voltage trim signal DTRIM in accordance with a system status signal ConFlag. In one embodiment, system status signal ConFlag is configured to indicating the system state such as normal operation, soft-start operation, light-load operation and power-saving operation. Digital controller 51 is configured to preset corresponding voltage trim coefficient based on slope compensation signal VSLOPE at corresponding system state. In one embodiment, voltage trim coefficient Trim1 equals amplitude of slope compensation signal VSLOPE at normal operation, voltage trim coefficient Vtrim2 equals amplitude of slope compensation signal VSLOPE at soft-start operation, voltage trim coefficient Vtrim3 equals amplitude of slope compensation signal VSLOPE at light-load operation, and voltage trim coefficient Vtrim4 equals amplitude of slope compensation signal VSLOPE at power-saving operation. In one embodiment, slope compensation signal VSLOPE is digital signal and may be provided by digital controller 51.

Figure 6:
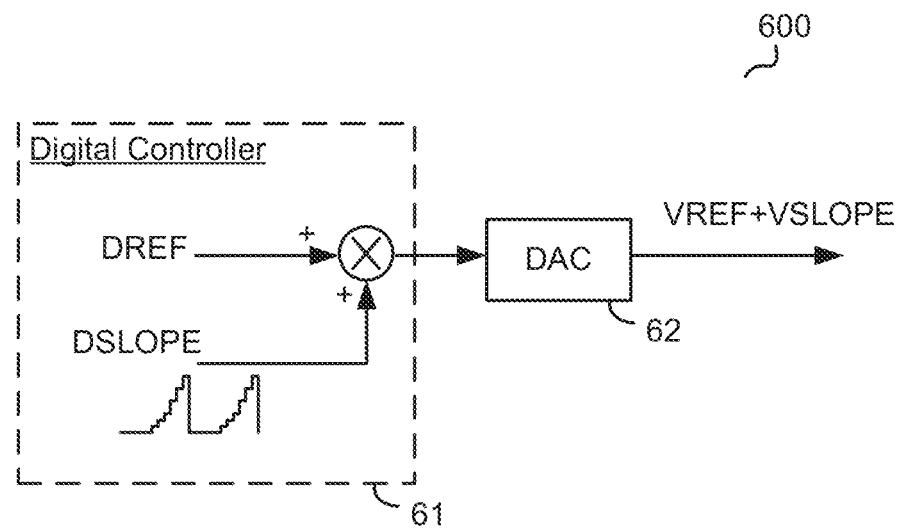
FIG. 6 schematically illustrates a slope compensation module 600 according to an embodiment of the present invention.

FIG. 6 schematically illustrates a slope compensation module 600 according to an embodiment of the present invention. A digital reference signal DREF and a digital compensation signal DSLOPE are generated by a digital controller 61. Digital controller 61 adds digital compensation signal DSLOPE to digital reference signal DREF and provides an adding result to a digital-to-analog converter (DAC) 62. DAC 62 is configured to provide an analog signal representing sum of reference signal VREF and slope compensation signal VSLOPE. Digital controller 61 may be configured to adjust slew rate SR of slope compensation signal VSLOPE and amplitude VRAMP of slope compensation signal VSLOPE via adjusting digital compensation signal DSLOPE.

Figure 7:
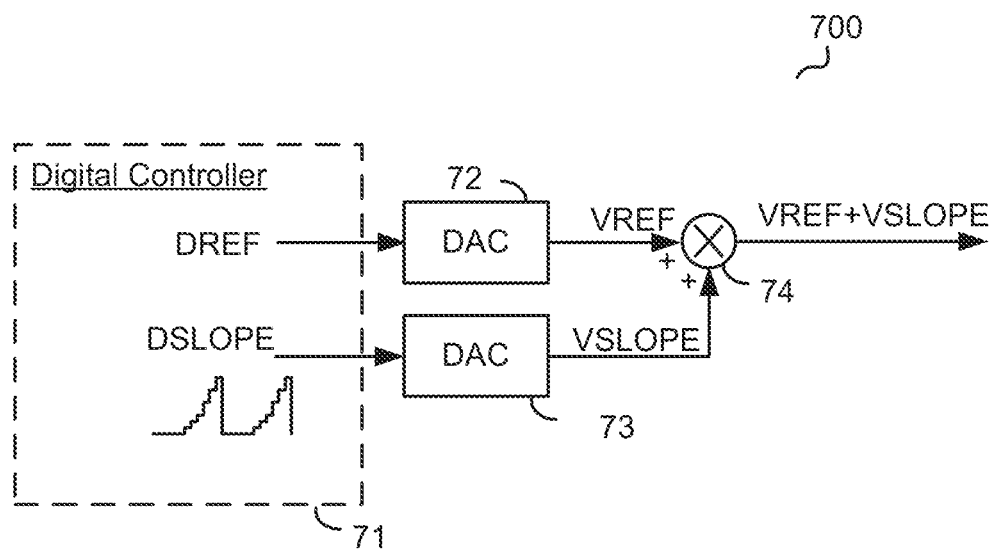
FIG. 7 schematically illustrates a slope compensation module 700 according to another embodiment of the present invention.

FIG. 7 schematically illustrates a slope compensation module 700 according to another embodiment of the present invention. Digital reference signal DREF and digital compensation signal DSLOPE are generated by a digital controller 71. A DAC 72 is configured to receive digital reference signal DREF and is configured to provide reference signal VREF. A DAC 73 is configured to receive digital compensation signal DSLOPE and is configured to provide slope compensation signal VSLOPE. An operation circuit 74 is configured to receive slope compensation signal VSLOPE and reference signal VREF, and is configured to provide sum of slope compensation signal VSLOPE and reference signal VREF. Digital controller 71 may be configured to adjust slew rate SR of slope compensation signal VSLOPE and amplitude VRAMP of slope compensation signal VSLOPE via adjusting digital compensation signal DSLOPE.

Figure 8:
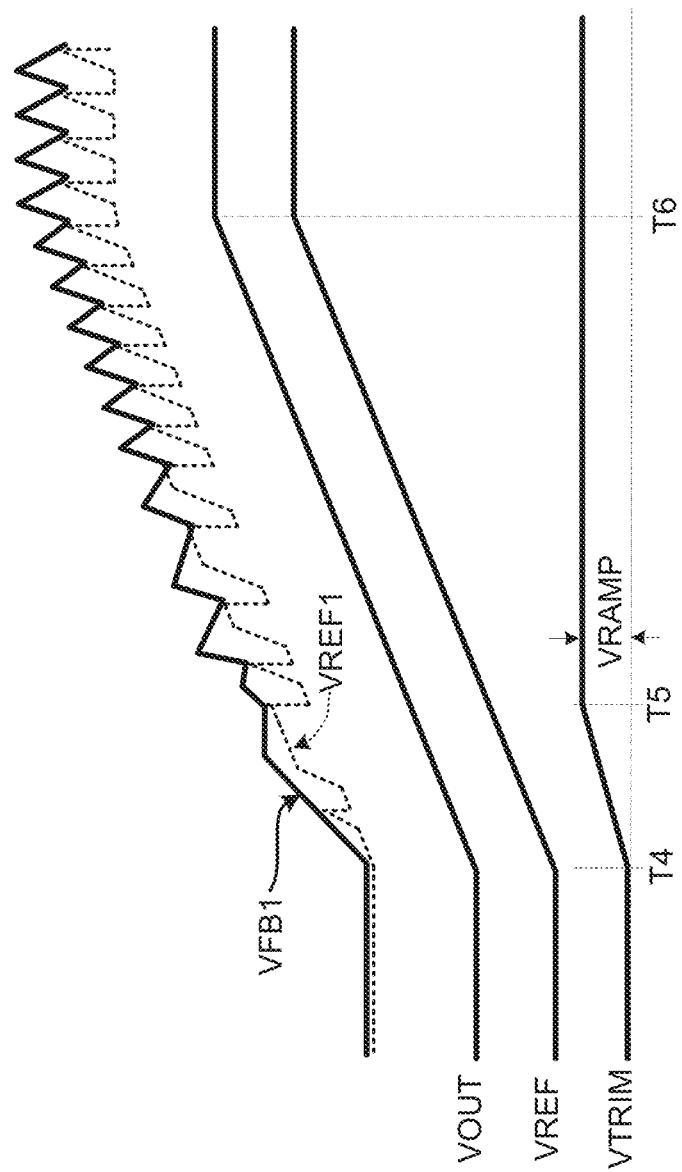
FIG. 8 shows waveforms illustrating signals of switching converter 200 as shown in FIG. 2 when switching converter 200 transits from soft-start operation to normal operation according to an embodiment of the present invention.

FIG. 8 shows waveforms illustrating signals of switching converter 200 as shown in FIG. 2 when switching converter 200 transits from soft-start operation to normal operation according to an embodiment of the present invention. Waveforms shown in FIG. 8 are corrected feedback signal VFB1, corrected reference signal VREF1, output voltage VOUT, reference signal VREF and voltage trim signal VTRIM. In one embodiment, corrected feedback signal VFB1 is sum of output voltage VOUT and voltage trim signal VTRIM, corrected reference signal VREF1 is sum of reference signal VREF and slope compensation signal VSLOPE. At time T4, switching converter 200 works at soft-start operation, voltage trim signal VTRIM increases from zero to amplitude VRAMP of slope compensation signal VSLOPE. In one embodiment, voltage trim signal VTRIM may equal amplitude VRAMP of slope compensation signal VSLOPE directly. Continuing with FIG. 8, reference signal VREF increases during soft-start operation, and output voltage VOUT increases accordingly. At time T5, voltage trim signal VTRIM achieves amplitude VRAMP of slope compensation signal VSLOPE. At time T6, switching converter 200 transits from soft-start operation to normal operation.

Figure 9:
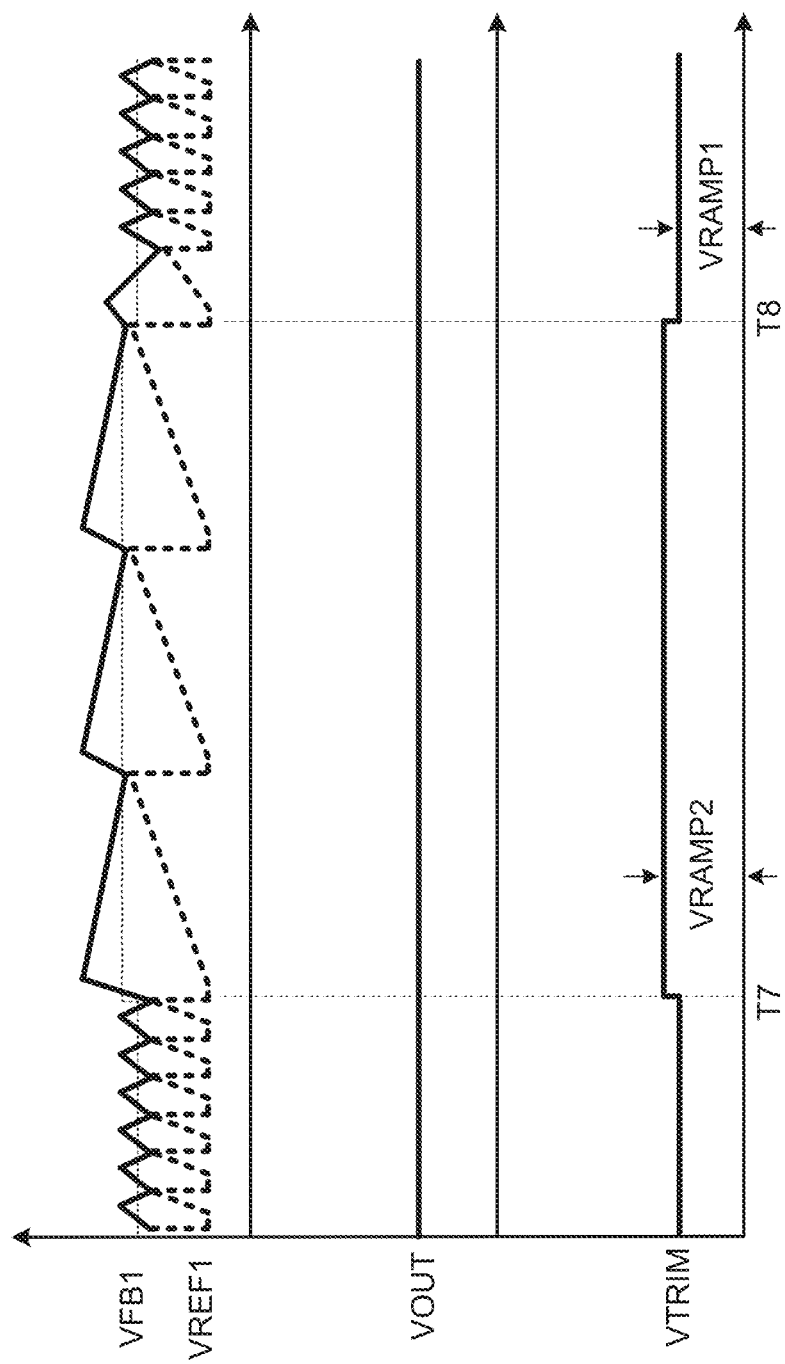
FIG. 9 shows waveforms illustrating signals of switching converter 200 as shown in FIG. 2 when switching converter 200 transits between light-load operation and normal operation according to an embodiment of the present invention.

FIG. 9 shows waveforms illustrating signals of switching converter 200 as shown in FIG. 2 when switching converter 200 transits between light-load operation and normal operation according to an embodiment of the present invention. Waveforms shown in FIG. 9 are corrected feedback signal VFB1, corrected reference signal VREF1, output voltage VOUT and voltage trim signal VTRIM. In one embodiment, corrected feedback signal VFB1 is sum of output voltage VOUT and voltage trim signal VTRIM, corrected reference signal VREF1 is sum of reference signal VREF and slope compensation signal VSLOPE. At time T7, switching converter 200 transits to light-load operation, switching frequency of switching circuit 21 decreases, amplitude of slope compensation signal VSLOPE increases to VRAMP2, and voltage trim signal VTRIM increases to amplitude VRAMP2 accordingly. At time T8, switching converter 200 transits to normal operation, amplitude of slope compensation signal VSLOPE decreases to VRAMP1, and voltage trim signal VTRIM decreases to amplitude VRAMP1 accordingly.

Figure 10:
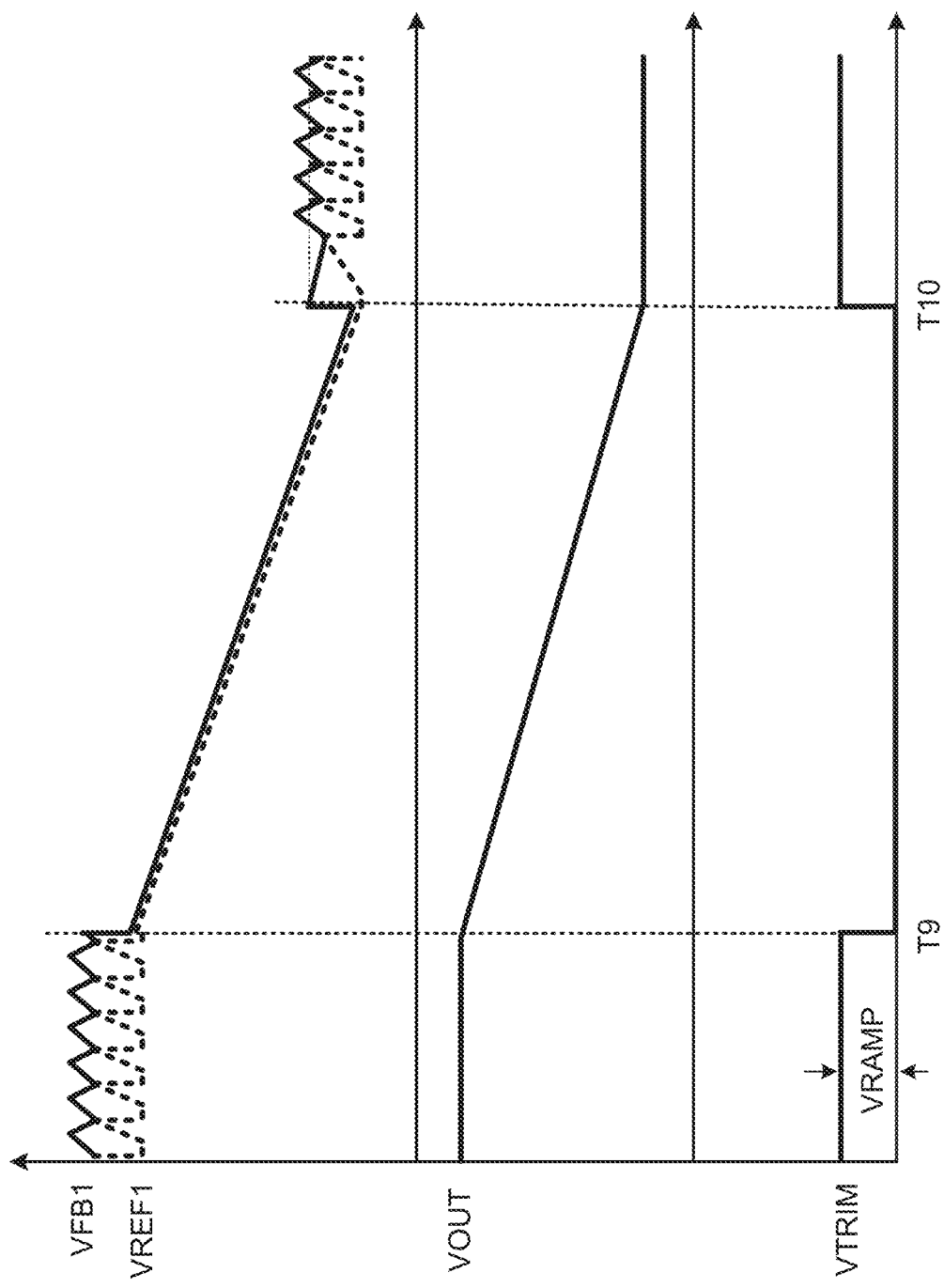
FIG. 10 shows waveforms illustrating signals of switching converter 200 as shown in FIG. 2 when switching converter 200 transits between power-saving operation and normal operation according to an embodiment of the present invention.

FIG. 10 shows waveforms illustrating signals of switching converter 200 as shown in FIG. 2 when switching converter 200 transits between power-saving operation and normal operation according to an embodiment of the present invention. Waveforms shown in FIG. 10 are corrected feedback signal VFB1, corrected reference signal VREF1, output voltage VOUT and voltage trim signal VTRIM. In one embodiment, corrected feedback signal VFB1 is sum of output voltage VOUT and voltage trim signal VTRIM, corrected reference signal VREF1 is sum of reference signal VREF and slope compensation signal VSLOPE. Voltage trim signal VTRIM equals amplitude VRAMP of slope compensation signal VSLOPE when switching converter 200 works at normal operation. At time T9, switching converter 200 transits to power-saving operation, switch S1 and S2 are turned OFF, output voltage VOUT decreases accordingly, slope compensation signal VSLOPE becomes zero, and voltage trim signal VTRIM becomes zero accordingly. At time T10, switching converter 200 transits back to normal operation, switch S1 and switch S2 are turned ON and turned OFF alternately to regulate output voltage VOUT, and voltage trim signal VTRIM equals amplitude VRAMP of slope compensation signal VSLOPE.

Figure 11:
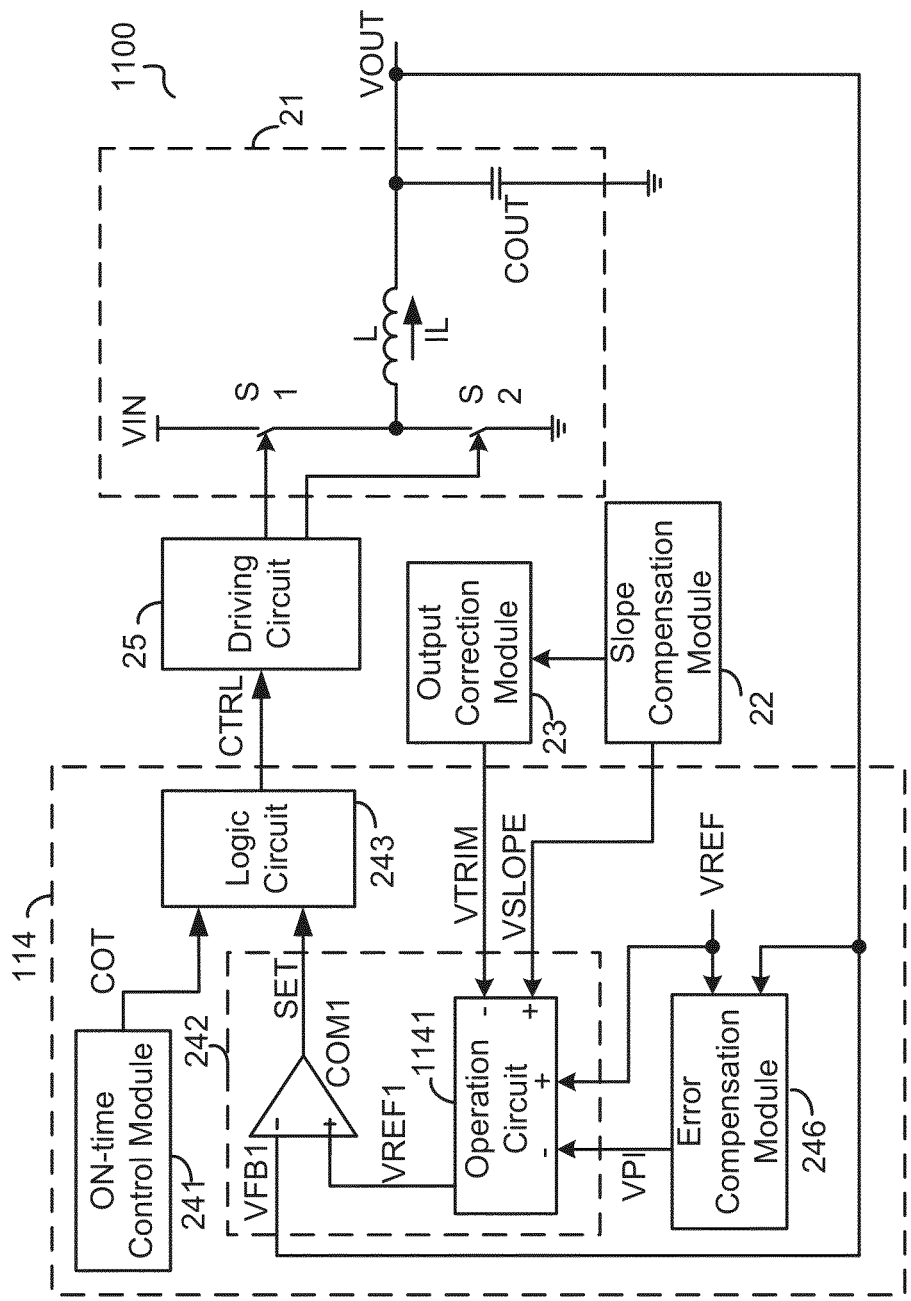
FIG. 11 schematically illustrates a switching converter 1100 according to an embodiment of the present invention.

FIG. 11 schematically illustrates a switching converter 1100 according to an embodiment of the present invention. Switching converter 1100 comprises switching circuit 21, slope compensation module 22, output correction module 23 and a control module 114. Control module 114 comprises ON-time control module 241, comparison module 242 comprising an operation circuit 1141 and comparator COM1, and logic module 243. Control module 114 further comprises error compensation module 246 configured to provide error compensation signal VPI based on the difference between reference signal VREF and output voltage VOUT. As shown in FIG. 11, operation circuit 1141 is configured to receive voltage trim signal VTRIM, slope compensation signal VSLOPE, reference signal VREF and error compensation signal VPI, and is configured to provide corrected reference signal VREF1 at its output terminal, where corrected reference signal VREF1 is determined by following equation (3):

$$VREF1 = VSLOPE + VREF - VTRIM - VPI \quad (3)$$

The non-inverting terminal of comparator COM1 is coupled to the output terminal of operation circuit 1141 to receive corrected reference signal VREF1, the inverting terminal of comparator COM1 is coupled to switching circuit 21 to receive output voltage VOUT, and the output terminal of comparator COM1 is configured to provide comparison signal SET.

Figure 12:
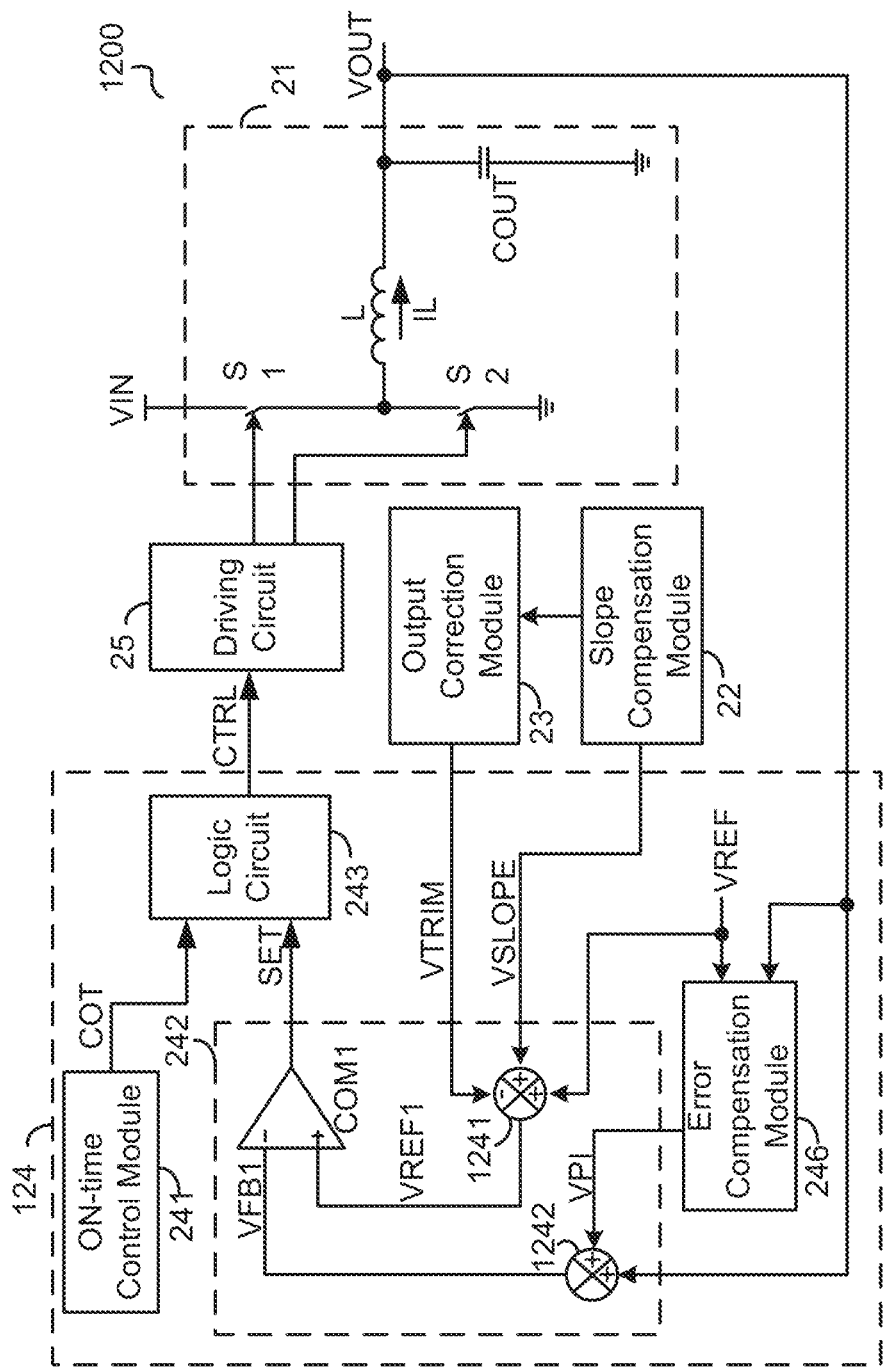
FIG. 12 schematically illustrates a switching converter 1200 according to an embodiment of the present invention.

FIG. 12 schematically illustrates a switching converter 1200 according to an embodiment of the present invention. Switching converter 1200 comprises switching circuit 21, slope compensation module 22, output correction module 23 and a control module 124. Control module 124 comprises ON-time control module 241, comparison module 242 comprising comparator COM1, an operation circuit 1241 and an operation circuit 1242, and logic module 243. Control module 124 further comprises error compensation module 246 configured to provide error compensation signal VPI based on the difference between reference signal VREF and output voltage VOUT. Operation circuit 1241 is configured to receive voltage trim signal VTRIM, slope compensation signal VSLOPE and reference signal VREF, and is configured to provide corrected reference signal VREF1 at its output terminal, where corrected reference signal VREF1 is determined by following equation (4):

$$VREF1 = VSLOPE + VREF - VTRIM \quad (4)$$

Operation circuit 1242 is configured to receive error compensation signal VPI and output voltage VOUT, and is configured to provide corrected feedback signal VFB1 at its output terminal, where corrected feedback signal equals sum of error compensation signal VPI and output voltage VOUT. The non-inverting terminal of comparator COM1 is coupled to the output terminal of operation circuit 1241 to receive corrected reference signal VREF1, the inverting terminal of comparator COM1 is coupled to the output terminal of operation circuit 1242 to receive corrected feedback signal VFB1 and the output terminal of comparator COM1 is configured to provide comparison signal SET.

Figure 13:
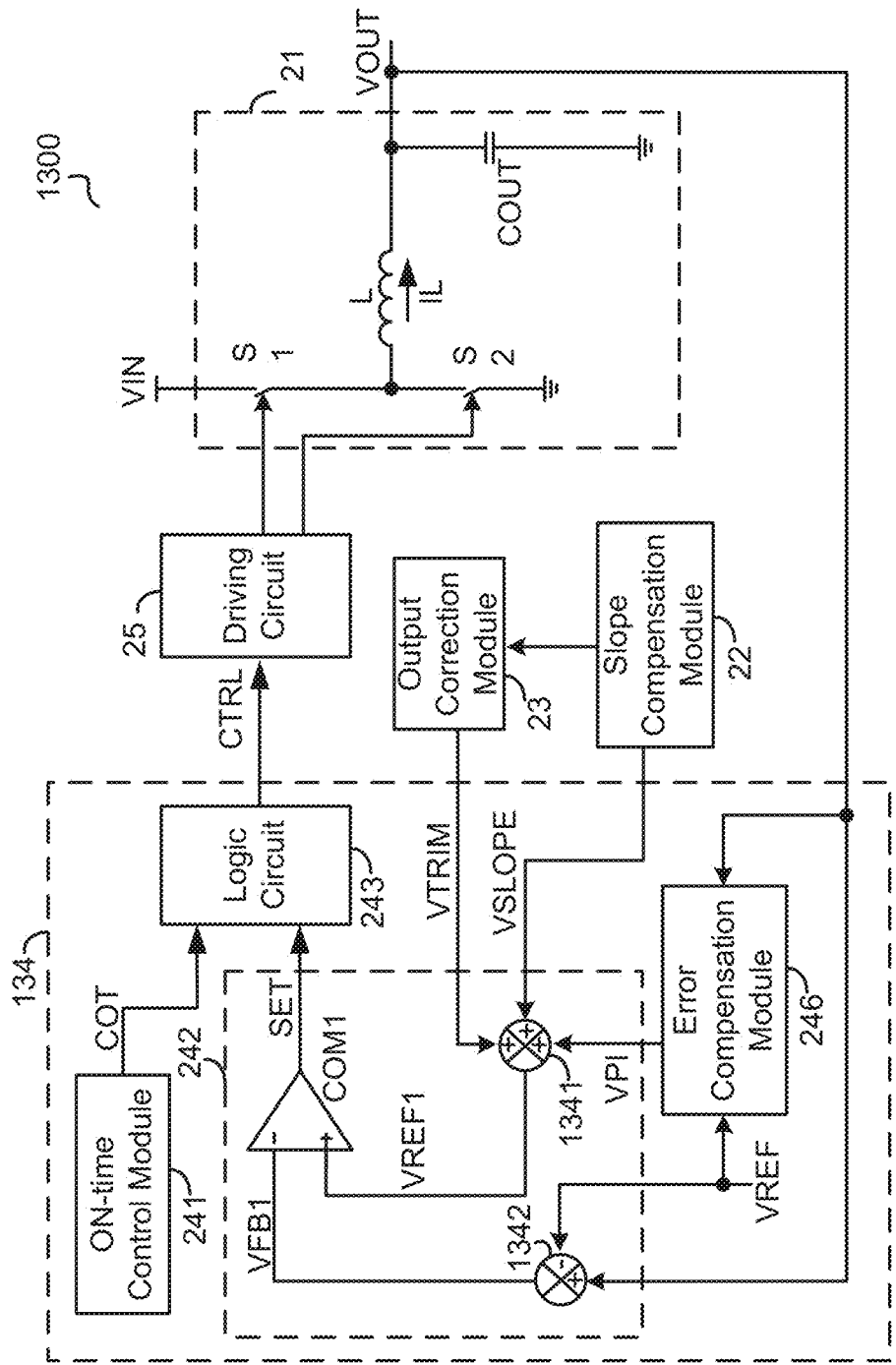
FIG. 13 schematically illustrates a switching converter 1300 according to an embodiment of the present invention.

FIG. 13 schematically illustrates a switching converter 1300 according to an embodiment of the present invention. Switching converter 1300 comprises switching circuit 21, slope compensation module 22, output correction module 23 and a control module 134. Control module 134 comprises ON-time control module 241, comparison module 242 comprising comparator COM1, an operation circuit 1341 and an operation circuit 1342, and logic module 243. Control module 134 further comprises error compensation module 246 configured to provide error compensation signal VPI based on the difference between reference signal VREF and output voltage VOUT. Operation circuit 1341 is configured to receive voltage trim signal VTRIM, slope compensation signal VSLOPE and error compensation signal VPI, and is configured to provide corrected reference signal VREF1 at its output terminal, where corrected reference signal VREF1 is determined by following equation (5):

$$VREF1 = VSLOPE + VPH + VTRIM \quad (5)$$

Operation circuit 1342 is configured to receive reference signal VREF and output voltage VOUT, and is configured to provide corrected feedback signal VFB1 at its output terminal, where corrected feedback signal VFB1 equals difference between output voltage VOUT and reference signal VREF (VOUT-VREF). The non-inverting terminal of comparator COM1 is coupled to the output terminal of operation circuit 1341 to receive corrected reference signal VREF1, the inverting terminal of comparator COM1 is coupled to the output terminal of operation circuit 1342 to receive corrected feedback signal VFB1, and the output terminal of comparator COM1 is configured to provide comparison signal SET.

Figure 14:
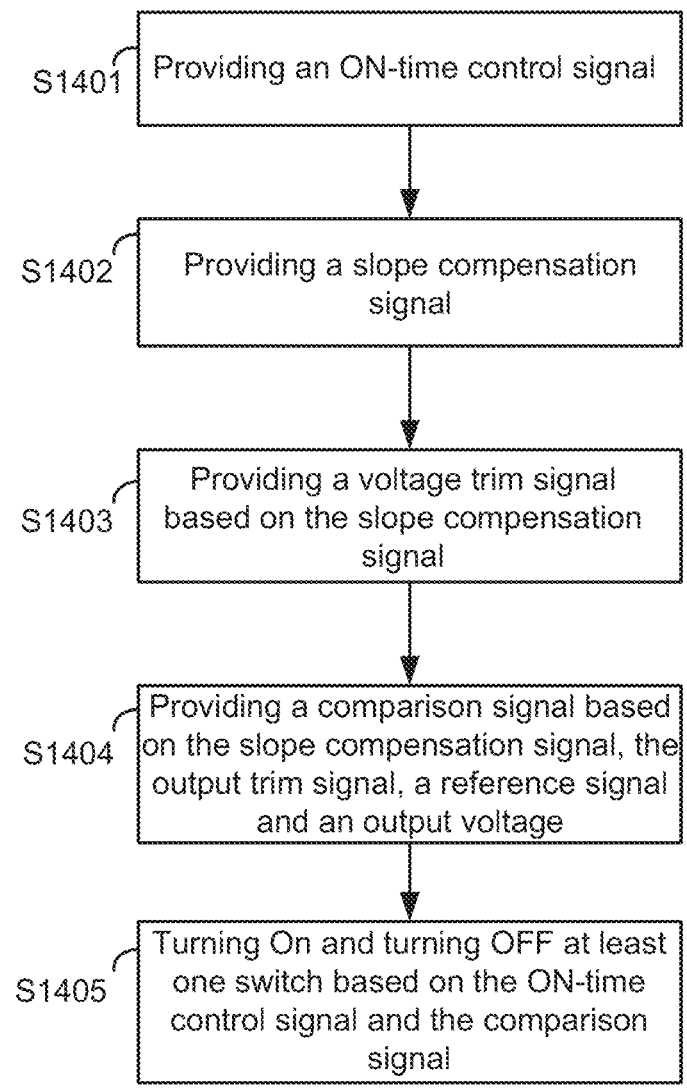
FIG. 14 shows a flow chart illustrating a control method with reference to a switching converter according to an embodiment of the present invention.

FIG. 14 shows a flow chart illustrating a control method with reference to a switching converter according to an embodiment of the present invention. The switching converter comprises a switching circuit comprising at least one switch. The control method comprises steps S1401-S1405.

At step S1401, providing an ON-time control signal.
At step S1402, providing a slope compensation signal.
At step S1403, providing a voltage trim signal based on the slope compensation signal. In one embodiment, step S1403 comprises providing the voltage trim signal based on amplitude of the slope compensation signal. In one embodiment, step S1403 comprises providing the voltage trim signal based on a slew rate of the slope compensation signal and a time period during which the slope compensation signal increases.

In one embodiment, real-time calculation of the voltage trim signal is implemented based on a switching period of the switching converter, the slew rate of the slope compensation signal, and a time period during which the slope compensation signal maintains or decreases. In one embodiment, off-line method is implemented to provide the voltage trim signal. For example, providing the voltage trim signal based on one of multiple voltage trim coefficients in accordance with corresponding system state. The system state may comprise normal operation, soft-start operation, light-load operation and power-saving operation. In one embodiment, corresponding voltage trim coefficient equals amplitude of the slope compensation signal at corresponding system state.

At step S1404, providing a comparison signal based on the slope compensation signal, the voltage trim signal, a reference signal and an output voltage of the switching converter.

At step S1405, turning ON and turning OFF at least one switch of the switching circuit based on the ON-time control signal and the comparison signal. In one embodiment, the at least one switch is turned OFF when the ON-time control signal is effective, and the at least one switch is turned ON when the comparison signal is effective.

Note that in the flow chart described above, the box functions may also be implemented with different order as shown in FIG. 14. For example, two successive box functions may be executed meanwhile, or sometimes the box functions may be executed in reverse order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control circuit for controlling a switching converter, the switching converter having at least one switch and an output terminal configured to provide an output voltage, the control circuit comprising:
   a slope compensation module having an output terminal configured to provide a slope compensation signal, wherein the slope compensation signal increases when the at least one switch is turned OFF;
   an output correction module having an output terminal configured to provide a voltage trim signal based on the slope compensation signal; and
   a control module having a first input terminal, a second input terminal, a third input terminal, a fourth input terminal, and an output terminal, wherein the first input terminal is coupled to the output terminal of the output correction module to receive the voltage trim signal, the second input terminal is coupled to the output terminal of the slope compensation module to receive the slope compensation signal, the third input terminal is coupled to the output terminal of the switching converter, the fourth input terminal is configured to receive a reference signal, and the output terminal is configured to provide a control signal to control the at least one switch.

2. The control circuit of claim 1, wherein the control module further comprising:
   an error compensation module, configured to provide an error compensation signal based on a difference between the output voltage and a set target of the output voltage; and wherein
   the at least one switch is turned ON when the sum of the slope compensation signal and the reference signal is larger than the sum of the voltage trim signal, a feedback signal representing the output voltage and the error compensation signal.

3. The control circuit of claim 1, wherein the control module further comprising:
   an error compensation module having a first input terminal, a second input terminal and an output terminal, wherein the first input terminal is configured to receive the reference signal, the second input terminal is coupled to the output terminal of the switching converter, and the output terminal is configured to provide an error compensation signal based on a difference between the reference signal and a feedback signal representing the output voltage;
   a comparison module having a first input terminal, a second input terminal, a third input terminal, a fourth input terminal, a fifth input terminal and an output terminal, wherein the first input terminal is coupled to the output terminal of the slope compensation module, the second input terminal is coupled to the output terminal of the output correction module, the third input terminal is coupled to the output terminal of the switching converter, the fourth input terminal is configured to receive the reference signal, the fifth input terminal is coupled to the output terminal of the error compensation module to receive the error compensation signal, and the output terminal is configured to provide a comparison signal based on the slope compensation signal, the voltage trim signal, the output voltage, the reference signal and the error compensation signal;
   an ON-time control module having an output terminal configured to provide an ON-time control signal, wherein the ON-time control signal is configured to control an ON-time period of the at least one switch; and
   a logic module having a first input terminal, a second input terminal and an output terminal, wherein the first input terminal is coupled to the output terminal of the comparison module, the second input terminal is coupled to the output terminal of the ON-time control module, and the output terminal is configured to provide the control signal to turn ON the at least, one switch based on the comparison signal and turn OFF the at least one switch based on the ON-time control signal.

4. The control circuit of claim 3, wherein the comparison module further comprising:
   a first operation circuit having a first input terminal, a second input terminal, a third input terminal and an output terminal, wherein the first input terminal is coupled to the output terminal of the output correction module to receive the voltage trim signal, the second input terminal is coupled to the output terminal of the switching converter, the third input terminal is coupled to the output terminal of the error compensation module, and the output terminal is configured to provide a corrected feedback signal based on the voltage trim signal, the output voltage and the error compensation signal;
   a second operation circuit having a first input terminal, a second input terminal and an output terminal, wherein the first input terminal is coupled to the output terminal of the slope compensation module to receive the slope compensation signal, the second input terminal is configured to receive the reference signal, and the output terminal is configured to provide a corrected reference signal based on the slope compensation signal and the reference signal; and
   a comparator having a first input terminal, a second input terminal and an output terminal, wherein the first input terminal is coupled to the output terminal of the first operation circuit, the second input terminal is coupled to the output terminal of the second operation circuit, and the output terminal is configured to provide the comparison signal based on comparing the corrected feedback signal with the corrected reference signal.

5. The control circuit of claim 3, wherein the comparison module further comprising:
a third operation circuit having a first input terminal, a second input terminal, a third input terminal, a fourth input terminal and an output terminal, wherein the first input terminal is configured to receive the reference signal, the second input terminal is coupled to the output terminal of the slope compensation module to receive the slope compensation signal, the third input terminal is coupled to the output terminal of the output correction module to receive the voltage trim signal, the fourth input terminal is coupled to the output terminal of the error compensation module to receive the error compensation signal, and the output terminal is configured to provide a corrected reference signal based on the reference signal, the slope compensation signal, the voltage trim signal and the error compensation signal; and
a comparator having a first input terminal, a second input terminal and an output terminal, wherein the first input terminal is coupled to the output terminal of the switching converter, the second input terminal is coupled to the output terminal of the third operation circuit to receive the corrected reference signal, and the output terminal is configured to provide the comparison signal.

6. The control circuit of claim 3, wherein the comparison module further comprising:
a fourth operation circuit having a first input terminal, a second input terminal and an output terminal, wherein the first input terminal is coupled to the output terminal of the switching converter, the second input terminal is configured to receive the reference signal, and the output terminal is configured to provide a corrected feedback signal based on the output voltage and the reference signal;
a fifth operation circuit having a first input terminal, a second input terminal, a third input terminal and an output terminal, wherein the first input terminal is coupled to the output terminal of the slope compensation module to receive the slope compensation signal, the second input terminal is coupled to the output terminal of the output correction module to receive the voltage trim signal, the third input terminal is coupled to the error compensation module to receive the error compensation signal, and the output terminal is configured to provide a corrected reference signal based on the slope compensation signal, the voltage trim signal and the error compensation signal; and
a comparator having a first input terminal, a second input terminal and an output terminal, wherein the first input terminal is coupled to the output terminal of the fourth operation circuit, the second input terminal is coupled to the output terminal of the fifth operation circuit, and the output terminal is configured to provide the comparison signal based on comparing the corrected feedback signal with the corrected reference signal.

7. The control circuit of claim 3, wherein the comparison module further comprising:
a sixth operation circuit having a first input terminal, a second input terminal and an output terminal, wherein the first input terminal is coupled to the output terminal of the error compensation module to receive the error compensation signal, the second input terminal is coupled to the output terminal of the switching converter, and the output terminal is configured to provide a corrected feedback signal based on the error compensation signal and the output voltage;
a seventh operation circuit having a first input terminal, a second input terminal, a third input terminal and an output terminal, wherein the first input terminal is coupled to the output terminal of the output correction module to receive the voltage trim signal, the second input terminal is coupled to the output terminal of the slope compensation module to receive the slope compensation signal, the third input terminal is configured to receive the reference signal, and the output terminal is configured to provide a corrected reference signal based on the voltage trim signal, the slope compensation signal and the reference signal; and
a comparator having a first input terminal, a second input terminal and an output terminal, wherein the first input terminal is coupled to the output terminal of the sixth operation circuit, the second input terminal is coupled to the output terminal of the seventh operation circuit, and the output terminal is configured to provide the comparison signal based on comparing the corrected feedback signal with the corrected reference signal.

8. The control circuit of claim 1, wherein the voltage trim signal is adjusted having a positive relationship with the amplitude of the slope compensation signal.

9. The control circuit of claim 1, wherein the voltage trim signal is adjusted based on a slew rate of the slope compensation signal and a time period during which the slope compensation signal increases.

10. The control circuit of claim 1, wherein the output correction module is configured to provide the voltage trim signal based on one of a plurality of voltage trim coefficients according to a system state.

11. The control circuit of claim 1, wherein the output correction module further comprising:
a register having a plurality of output terminals configured to provide a plurality of voltage trim coefficients; and
a multiplexer having a plurality of input terminals, a control terminal and an output terminal, wherein the plurality of input terminals is coupled to the plurality of output terminals of the register, the control terminal is configured to receive a system status signal, and the output terminal is configured to provide the voltage trim signal based on one of the plurality of voltage trim coefficients in accordance with the system status signal.

12. A control method for a switching converter, the switching converter having an output terminal configured to provide an output voltage, the switching converter having at least one switch, the control method comprising:
providing an ON-time control signal to control an ON-time period of the at least one switch;
providing a slope compensation signal, wherein the compensation signal increases with a slew rate when the at least one switch is turned OFF;
providing a voltage trim signal based on the slope compensation signal;
providing an error compensation signal based on a difference between the output voltage and a set target of the output voltage;
providing a comparison signal based on the slope compensation signal, the voltage trim signal, the error compensation signal, a reference signal and the output voltage; and turning ON the at least one switch based on the comparison signal and turning OFF the at least one switch based on the ON-time control signal.

13. The control method of claim 12, wherein providing the voltage trim signal further comprising:
   providing a plurality of voltage trim coefficients; and
   choosing one of the voltage trim coefficients as the voltage trim signal in accordance with a system state.

14. The control method of claim 12, wherein the voltage trim signal is adjusted based on the amplitude of the slope compensation signal.

15. The control method of claim 12, wherein the at least one switch is turned ON when the sum of the slope compensation signal and the reference signal is larger than the sum of the voltage trim signal, the error compensation signal, and a feedback signal representing the output voltage.

16. A switching converter having an input terminal and an output terminal configured to provide an output voltage, wherein the switching converter comprising:
   a first switch having a first terminal, a second terminal and a control terminal, wherein the first terminal is coupled to the input terminal of the switching converter; and
   a control circuit having an input terminal and an output terminal, wherein the input terminal is coupled to the output terminal of the switching converter, and the output terminal is coupled to the control terminal of the first switch to provide a control signal; and wherein
   the control signal is configured to turn ON the first switch based on a slope compensation signal, a voltage trim signal, a reference signal and the output voltage.

17. The switching converter of claim 16, wherein the switching converter further comprising:
   a second switch having a first terminal, a second terminal and a control terminal, wherein the first terminal is coupled to the second terminal of the first switch, the second terminal is coupled to a system ground, and the control terminal is coupled to the output terminal of the control circuit;
   an inductor having a first terminal and a second terminal, wherein the first terminal is coupled to the second terminal of the first switch and the first terminal of the second switch; and
   a capacitor having a first terminal and a second terminal, wherein the first terminal is coupled to the second terminal of the inductor, and the second terminal is coupled to the system ground.

18. The switching converter of claim 16, wherein the control circuit further comprising:
   a slope compensation module having an output terminal configured to provide the slope compensation signal;
   an output correction module having an output terminal configured to provide the voltage trim signal based on the slope compensation signal; and
   a control module having a first input terminal, a second input terminal, a third input terminal, a fourth input terminal and an output terminal, wherein the first input terminal is coupled to the output terminal of the output correction module to receive the voltage trim signal, the second input terminal is coupled to the output terminal of the slope compensation module to receive the slope compensation signal, the third input terminal is coupled to the output terminal of the switching converter, the fourth input terminal is configured to receive the reference signal, and the output terminal is configured to provide the control signal.

19. The switching converter of claim 18, wherein the control module further comprising:
   a comparison module having a first input terminal, a second input terminal, a third input terminal, a fourth input terminal and an output terminal, wherein the first input terminal is coupled to the output terminal of the slope compensation module, the second input terminal is coupled to the output terminal of the output correction module, the third input terminal is coupled to the output terminal of the switching converter, the fourth input terminal is configured to receive the reference signal, and the output terminal is configured to provide a comparison signal based on the slope compensation signal, the reference signal, the voltage trim signal and the output voltage;
   an ON-time control module having an output terminal configured to provide an ON-time control signal, wherein the ON-time control signal is configured to control an ON-time period of the first switch; and
   a logic module having a first input terminal, a second input terminal and an output terminal, wherein the first input terminal is coupled to the output terminal of the comparison module, the second input terminal is coupled to the output terminal of the ON-time control module, and the output terminal is configured to provide the control signal to turn ON the first switch based on the comparison signal and turn OFF the first switch based on the ON-time control signal.

20. The switching converter of claim 18, wherein the control module further comprising:
   an error compensation module, configured to provide an error compensation signal based on a difference between the output voltage and a set target of the output voltage; and wherein
   the first switch is turned ON when the sum of the slope compensation signal and the reference signal is larger than the sum of the voltage trim signal, the error compensation signal, and a feedback signal representing the output voltage.

* * * * *